United States Patent [19]

van Calsteren et al.

[11] 3,944,405

[45] Mar. 16, 1976

[54] DOWN-FLOW CHAMBER

[75] Inventors: Francois Adriaan van Calsteren, Rijswijk Z.H.; Willem Pieter Hiestand, Delft, both of Netherlands

[73] Assignee: Nederlandse Organisatie voor Toegepast-Natuurwetenschappelijk Onderzook ten behoeve van de Volksgezondheid, The Hague, Netherlands

[22] Filed: Nov. 26, 1973

[21] Appl. No.: 418,940

[30] Foreign Application Priority Data

Nov. 24, 1972 Netherlands .......................... 7215945

[52] U.S. Cl. ............... 55/338; 55/473; 55/DIG. 29; 98/115 LH

[51] Int. Cl.² .......................................... B01D 46/00

[58] Field of Search ............. 55/467, 470, 471, 472, 55/473, 338, DIG. 18, DIG. 29; 98/115 K, 115 LH

[56] References Cited

UNITED STATES PATENTS

| | | | |
|---|---|---|---|
| 1,032,112 | 7/1912 | Challinor | 160/238 |
| 1,648,994 | 11/1927 | Pitman | 160/290 R |
| 3,151,929 | 10/1964 | Potapenkd | 55/DIG. 29 |
| 3,273,323 | 9/1966 | Whitfield | 55/DIG. 29 |
| 3,340,788 | 9/1967 | Landingham | 98/115 LH |
| 3,752,056 | 8/1973 | Chamberlin | 98/115 LH |
| 3,777,736 | 12/1973 | Van der Waaj | 55/DIG. 29 |
| 3,811,250 | 5/1974 | Fowler, Jr. | 55/DIG. 29 |

*Primary Examiner*—Bernard Nozick
*Attorney, Agent, or Firm*—Spencer & Kaye

[57] ABSTRACT

A down-flow chamber in which, from a filter in the ceiling of a working room, a germfree and dustfree flow of air is directed downwardly to a working face that is surrounded by walls with exhaust openings for the flow of air at the edges and in which, at the front, a transparent wall is mounted. Between the lower edge of the transparent wall and an exhaust grid in front of the working face there is a vertical opening of such a height that arms can be put through the opening to be able to carry out operations in the working room, wherein at the lower edge of the transparent wall a flexible lid preferably of smooth plastics material is mounted that is hanging down and is substantially extending to the exhaust grid. Further, a device is provided on the chamber that prevents the lid from moving outwardly from the vertical plane through the opening.

5 Claims, 2 Drawing Figures

DOWN-FLOW CHAMBER

BACKGROUND OF THE INVENTION

The invention relates to a down-flow chamber, in which, from a filter in the ceiling of a working room, an air flow free of germs and dust is directed downwardly on a working face surrounded by walls with exhaust openings for the air flow at the front and the back.

At the front of the chamber a transparent wall is provided and between the lower edge of that wall and an exhaust grid in front of the working face there is a vertical slit or opening of such a height that the arms, protected by gloves with long gauntlets, can be put through the slit to carry out activities in the working room.

Through the slit materials and additional means can also be brought into the working room.

The large exhaust grid in front of the working face has a great capacity so that air is sucked in both from within the chamber and from its outside.

Hence an air curtain is provided that prevents ambient air from entering the working room and further, prevents the air in the working room from escaping directly into the ambient atmosphere.

The air supplied from above through the filter sweeps past the inner surface of the transparent front wall and the ambient air sweeps past the outer surface of the same.

If the exhaust capacity of the grid is not great enough or is hampered, contaminated air can flow from the inside to the outside or from the outside to the inside.

When in the working room viruses or bacteria or other dangerous products are handled that should under no condition escape from the chamber according to the invention, at the lower edge of the transparent wall a flexible lid, preferably of smooth plastics material is provided, that is hanging down and substantially extends to the exhaust grid and highly reduces the area of the vertical slit.

In order to be able to operate in the chamber, the arms are passed under the lid that is hanging down and it is lifted inwardly, the outer surface of the lid being in contact with the gauntlets over the arms.

The air flow in the working room along the transparent wall then is guided downwardly past the inner surface of the lid and disappears in the exhaust grid.

The air leakage flow past the outer surface increases by lifting the lid because it is sucked by a larger part of the exhaust grid.

Because the lower edge of the lid lies lower than the lower edge of the transparent wall and the air leakage flow has increased, the risk of vortexes, that might emerge under the lower edge of the lid to ambient air, is much smaller and, thus theoretically not one particle would be able to escape out of the working room to ambient air.

It has been found, however, that in withdrawing the arms the flexible lid is drawn along outwardly, while its inner surface sweeps over the gauntlets and thus transfers on to the gauntlets particles adhering to this surface. In this manner the particles are introduced directly into the ambient air with the gauntlets.

Moreover the air flow past the inner surface of the lid is guided to ambient air, while the air leakage flow is strongly reduced when the lower edge of the lid is able to move away from the zone of the exhaust grid.

Upon this occurrence, the vortexes of the inner air flow can escape from the working room under the lower edge of the lid to ambient air, thus taking along particles to ambient air.

SUMMARY OF THE INVENTION

In order to overcome these drawbacks, according to the invention means have been provided that prevent the lid from moving outwardly from the vertical plane through the slit.

The air leakage flow is no longer reduced, the vortexes, if any, under the lower edge of the lid are efficiently sucked into the exhaust grid and the risks of contact between the inner surface of the lid and the gauntlets are substantially reduced.

Preferably, these means according to the invention are formed by a rod attached to the lower edge of the lid, preferably in a seam of the lid, and by means of strips running downwardly from the transparent front wall to the exhaust grid in front of the sides of the lid and the ends of the rod.

The rods and strips prevent the lid from moving outwardly with its lower edge.

In the position of rest the lid with the rod is hanging practically in the center plane over the exhaust grid and can only move inwardly.

At the outer side of the lid there remains always a substantially constant air leakage flow that passes through the exhaust grid and in so doing drags along all particles that might emerge from the working room.

If the lid is lifted inwardly by means of the arms then the air leakage flow past the arms is increasing and so becomes more effective as regards dragging along particles towards the exhaust grid.

If the chamber is broad to enable two or more persons to work in the working room side by side, the lid can be divided in two or more juxtaposed parts. In such a case a strip is provided in front of the partition between the sections of the lid, which strip covers the partition and by which the rods of both sections are prevented from being able to move outwardly.

In an other embodiment according to the invention the means for preventing the lid from swinging outwardly may consist of an elastic belt at the lower edge of the lid and which at the ends of the lid is attached to the lower sides of the side walls or to the exhaust grid and forces the lid downwardly and may consist of strips that run downwardly from the transparent front wall to the exhaust grid in front of the side edges of the lid and the connection of the belt.

Because the belt is elastic, there might occur, for instance, in the center, an outward deflection of the lid and therefore it is advisable to provide in front of the plane of the lid vertical bars that also run downwardly from the transparent wall towards the exhaust grid.

These bars reduce the freedom of movement, however, and make it more difficult to bring materials and additional means into the working room.

DESCRIPTION OF THE PREFERRED EMBODIMENTS

Figure 1:
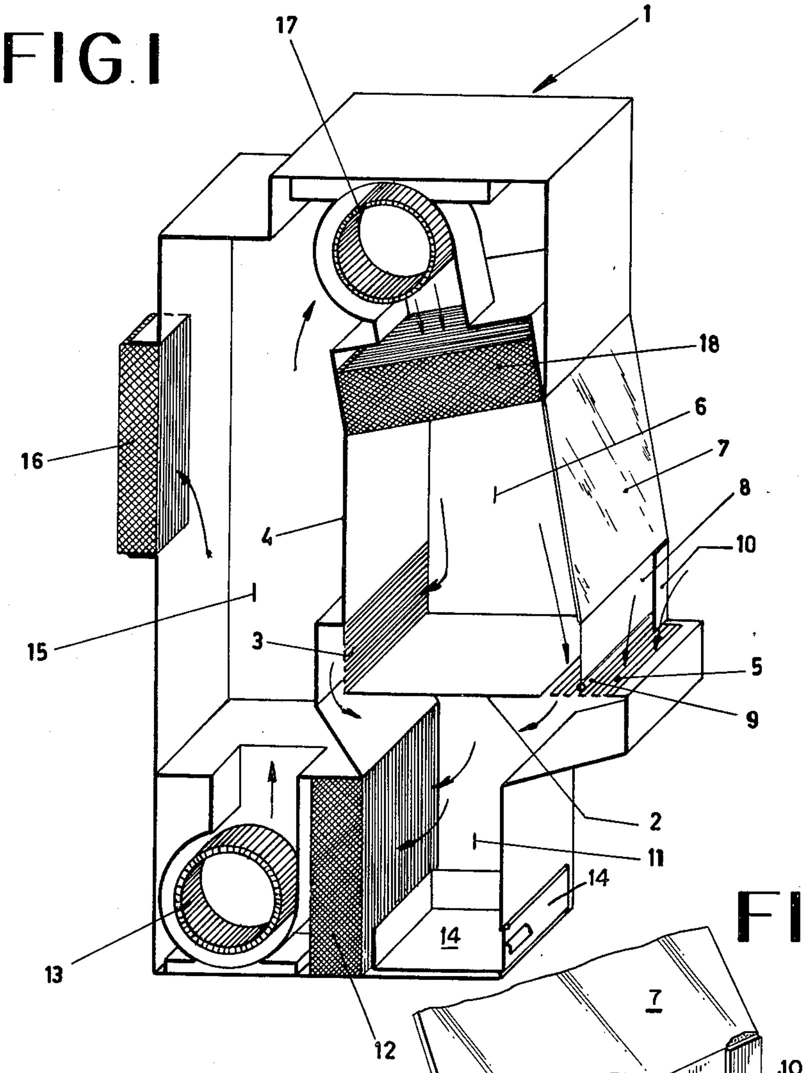
FIG. 1 illustrates in a perspective view a preferred embodiment of the invention and indicates the direction of air flow with arrows.

Turning now to FIG. 1, in a housing 1 of a down-flow chamber a working face 2 is provided at working height, which at the back edge abuts a vertical exhaust grid 3 in a back wall 4, at the side edges abuts the side walls of housing 1 and at the front edge abuts a horizontal exhaust grid 5.

The front side of working room 6, which is formed by the walls, is closed by a transparent plate 7, which ends over the center of the exhaust grid 5 at a height of 25 cm.

From this plate 7 a preferably transparent lid 8 made, for example, of smooth plastics, is hung. A rod 9 is attached to the lid 8 in a seam thereof and extends along the horizontal lower edge of the lid 8. The rod 9, together with the ends of lid 8, reaches behind strips 10 that run from plate 7 downwardly to exhaust grid 5.

Strips 10 are mounted to the side walls of the chamber and do not only cover the slit or opening between the ends of lid 8 and the side walls, but also prevent rod 9 with lid 8 from moving outwardly from the plane through strips 10.

Inwardly, however, lid 8 is entirely free to enter into working room 6 not only in a vertical but also in a horizontal direction.

If the chamber is broad so that two persons might be at work on working face 2, lid 8 is divided in two but then in front of the partition of the lid sections a further strip 10 is mounted, which runs downwardly and which prevents rod 9 of both sections of the lid from moving outwardly.

If in the one half of the chamber someone is at work then by the weight of rod 9 lid 8 in the other half is hanging downwardly up to 2 cm over exhaust grid 5.

In that half of the chamber in which someone is at work, rod 9 and lid 8 are lifted by the arms and moved inwardly whereby, more leakage air is sucked from the ambient air beside and between the arms than in the other half.

Such suction is generated because under working face 2 in the base of the chamber a suction room 11 is provided from which the contaminated air from grids 3 and 5 is removed laterally through a filter 12 with a powerful fan 13.

The coarse impurities fall from the air flow into room 11 and into a drawer 14, which can be emptied from time to time.

The small impurities such as bacteria, viruses or other particles that are dragged along with the air flow, are caught in filter 12.

At the back of the chamber the purified air flows from fan 13 upwardly into a back room 15, in the back wall in which there is provided an exhaust filter 16.

In the chamber at the upper side a fan 17 is mounted which sucks the pure air from back room 15 and forces it downwardly through a hepa filter 18 into working room 6.

In working room 6 a downward laminar flow of completely purified germfree and dustfree air is generated, which is exhausted through exhaust grids 3 and 5 after its contamination by the contents of working room 6.

The course of air flow generated by the fans 13 and 17 is indicated by arrows in the Figure.

By means of a variable transformer the lower fan 13 is adjusted to a greater capacity than upper fan 17 because it must also suck the leakage air in front of lid 8 through the part of exhaust grid 5 that lies outside working room 6.

The quantity of leakage air that is mixed in room 11 with the contaminated air from grid 3 and from the part of grid 5 that lies within lid 8, must be discharged in completely purified state from the chamber and it is for this reason that, therefor, exhaust filter 16 is mounted in the back wall.

Fans 13 and 17 must be coordinated not only as regards capacity but also as regards the possibilities of switching.

When energizing the fans, the lower fan 13 must be switched on first before upper fan 17 begins to operate, because otherwise a downward air flow is generated in working room 6 that is not blown outside through grids 3 and 5 but through the slit under lid 8. The result would be that bacteria viruses or other dangerous products would directly emerge from the chamber which must be prevented under all conditions.

When switching off the fans, care must be taken, on the contrary, that upper fan 17 is switched off before lower fan 13, because exhausting from working face 2 prevails over supply of air.

Both fans 13 and 17 are controlled by variable transformers so that the moved quantities of air and their velocities are adjustable.

Behind exhaust filter 16 a flow meter may be placed, which indicates the quantity of air that is blown out. This measure for the quantity of leakage air that enters exhaust grid 5.

Because there is a close relation between the quantity of leakage air and the quantity of air recirculating in the chamber, the circulation in the chamber can be controlled with this sole, permanently functioning flow meter and be kept at the correct value by adjusting the variable transformers.

The flow meter and the positions of the variable transformers also play a role in evaluating the degree of contamination of the filters and the point in time at which these must be cleaned.

By rod 9 and strips 10 a flow of leakage air is always provided in front of lid 8 and towards exhaust grid 5.

Lid 8 can only be moved towards working room 6 so that the flow of leakage air can only increase and can drag along vortexes to exhaust grid 5.

When the arms are put under lid 8 and lid 8 is lifted, the flow of leakage air that occurs by the sides of and between the arms will increase as a result of the strong exhaust through grid 5 and will drag along all particles from the arms into grid 5; a flow of air to ambient air thus cannot take place.

Figure 2:
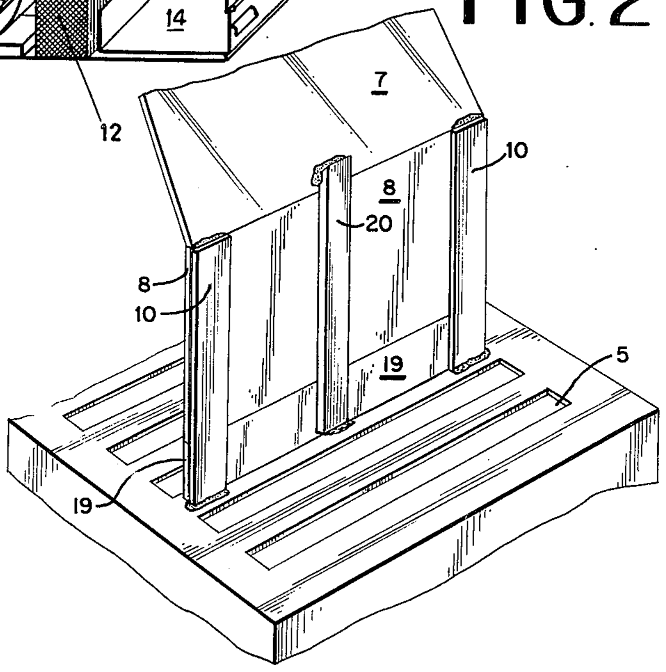
FIG. 2 is a perspective view of a modified detail of FIG. 1.

The rigid rod 9, if desired, might be replaced, as shown in FIG. 2 by an elastic belt 19, stretched taut, in the seam of lid 8 that has been connected at the ends of the lid behind strips 10 at the lower part of the side walls near the center of exhaust grid 5 and that pulls lid 8 down.

The elastic belt 19, however, might deform outwardly and in order to prevent this, vertical bars 20 (only one shown in FIG. 2) are expediently provided in several places in front of the lid that run from the lower edge of plate 7 downwardly to the center of grid 5.

These bars 20, however, may obstruct the introduction of objects into working room 6 under lid 8 and, therefore, the construction with rigid rod 9 is preferable.

We claim:

1. A laminar down-flow apparatus comprising in combination:

a. a ceiling, a working floor, side walls, a rear wall and a front wall defining a working room;

b. a grid provided in a front portion of said working floor and extending outwardly of said working room beyond said front wall;

c. means defining an opening in said front wall, said opening being of sufficient magnitude to allow an operator's hands to pass therethrough for performing work in said working room, said opening being bounded by said grid and a lower edge of said front wall spaced vertically from said grid;

d. a movable lid swingably mounted on said lower edge for normally covering said opening, said movable lid normally hanging in substantially vertical orientation and extending substantially down to said grid for dividing said grid into a first grid portion that is disposed in said working room and a second grid portion that is disposed outside said working room;

e. restraining means for preventing said lid from moving from its vertical position in a direction oriented outwardly of said working room;

f. an air inlet filter provided in said ceiling;

g. means defining a suction room beneath said working floor, said suction room being in direct communication with said working room through said first grid portion and with the ambient surroundings externally of said working room through said second grid portion;

h. channel means disposed externally of said working room and maintaining communication between said suction room and said filter; and i. fan means disposed in said channel means for forcing air from said channel means into said working room through said filter, from said working room into said suction chamber through said first grid portion and from the ambient surroundings into said suction room through said second grid portion.

2. Down-flow apparatus according to claim 1, wherein said lid substantially extends, when in its vertical position, to the center of said grid.

3. Down-flow apparatus as defined in claim 1, further including an elastic belt attached to a lower edge of said lid; strip members having one end attached to said grid and another end attached to said front wall, said strip members extending across said opening at opposite sides thereof on that side of said lid that is oriented away from said working room, said strip members constituting said restraining means; and at least one vertical bar extending from the lower edge of said front wall to said grid across said opening on that side of said lid that is oriented away from said working room.

4. Down-flow apparatus according to claim 1, further including a rod attached to and coextensive with a lower edge of said lid; and strip members having one end attached to said grid and another end attached to said front wall, said strip members extending across said opening at opposite sides thereof on that side of said lid that is oriented away from said working room, said strip members constituting said restraining means.

5. Down-flow apparatus according to claim 4, wherein said rod is mounted in a seam of the lid.

* * * * *